United States Patent [19]

Knutti et al.

[11] Patent Number: 4,680,606
[45] Date of Patent: Jul. 14, 1987

[54] SEMICONDUCTOR TRANSDUCER

[75] Inventors: James W. Knutti; Henry V. Allen, both of Fremont; Kurt E. Petersen, San Jose; Carl R. Kowalski, Fremont, all of Calif.

[73] Assignee: Tactile Perceptions, Inc., Fremont, Calif.

[21] Appl. No.: 617,122

[22] Filed: Jun. 4, 1984

[51] Int. Cl.$^4$ .......................... H01L 29/84; G01B 7/16
[52] U.S. Cl. ........................................ 357/26; 73/777; 307/278
[58] Field of Search ...................... 357/26, 55; 338/42; 73/721, 727, 777; 307/278; 29/580, 583

[56] References Cited

U.S. PATENT DOCUMENTS 4,079,508 3/1978 Nunn .......................... 357/26

FOREIGN PATENT DOCUMENTS 57-80532 5/1982 Japan ....................... 73/721

Primary Examiner—Andrew J. James
Assistant Examiner—Mark Prenty
Attorney, Agent, or Firm—Fitch, Even, Tabin & Flannery

[57] ABSTRACT

A semiconductor transducer (10) including a substrate having a well (18) formed in one surface thereof and a semiconductor layer (14) having a first surface (26) bonded to the substrate about the periphery of the well to form a diaphragm (30) and a second surface (28) which is substantially coplanar to the first surface and has a pedestal (16) projecting therefrom which is disposed above the well. The side walls (32) of the pedestal are substantially orthogonal to the second surface of the semiconductor layer. Means (34) are provided for sensing the deflection of the diaphragm as a function of force applied to the pedestal. The substrate includes protrusions (38) which extend upward from the bottom of the well to limit the deflection of the diaphragm.

27 Claims, 7 Drawing Figures

4,680,606

SEMICONDUCTOR TRANSDUCER

The present invention relates generally to transducers and more particularly to integrated circuit semiconductor transducers and a method for making such transducers.

BACKGROUND OF THE INVENTION

It is known that silicon microstructures may be used to form transducers for the sensing of pressure and the like. Typically, a silicon transducer includes a glass substrate having a well formed in one surface thereof. A first surface of a silicon layer is bonded or hermetically sealed to the surface of the glass substrate to form an interior chamber. The opposite exposed second surface of the silicon layer is selectively etched away above the chamber to form a diaphragm of a selected thickness. In a pressure transducer, the diaphragm is deflected in response to the pressure differential across the diaphragm. In a tactile transducer, the diaphragm is deflected in response to a force applied thereto. In either the pressure or tactile transducer, the deflection of the silicon diaphragm within a predetermined deflection range is a linear function of the forces acting on the diaphragm. For example, a 100 micron thick diaphragm may have a deflection range of 0.5-2.0 microns to measure forces between 1-4 pounds.

The transduction may be performed by measuring changes in component values of circuit elements wherein the component values are a function of the deflection of the diaphragm. For example, the interior chamber of the transducer may form a variable gap of a capacitor, the capacitor having a fixed plate at the bottom of the well and a movable plate on the diaphragm. Alternatively, the diaphragm may include piezoresistive elements whose resistive values change as a function of the stress and strain on the diaphragm due to its being deflected.

It is also desirable to put a plurality of such transducers in an array to form a sensing element for robotic fingers. In such an array, it is desirable for each transducer to be addressable. The addressability of each transducer allows the output signal developed by each transducer to be multiplexed onto a data bus for processing by a remote processor. The processor may then determine that an object has been grasped by the fingers, as well as the force the fingers are exerting on the object and the orientation of the object within the fingers.

A disadvantage and limitation of prior art semiconductor tactile transducers utilizing piezoresistive elements is that regions of maximum stress and strain of the diaphragm are a function of the point where force is applied to the diaphragm. To optimize accuracy and linearity of the tactile semiconductor transducer, it is desirable to place the piezoresistors within the regions of maximum deflection of the diaphragm. Thus, the alignment of the force vector of the force applied to the diaphragm with respect to the position of the piezoresistors is critical. The maximum stress and strain occurring within the diaphragm occurs at the clamp edge of the diaphragm about the periphery of the well. However, the piezoresistors must be offset from the clamp edge. Furthermore, since the piezoresistors are on the diaphragm when the silicon layer is bonded to the substrate, the piezorresistors are difficult to precisely align with respect to the periphery of the well which defines the clamp edge.

SUMMARY OF THE INVENTION

It is therefore an object of the present invention to overcome one or more of the disadvantages and limitations enumerated hereinabove.

It is a primary object of the present invention to provide a semiconductor transducer which is insensitive to misalignment of the force vector with respect to the piezoresistive sensing elements.

It is an important object of the present invention to provide a semiconductor transducer which is not sensitive to alignment of the piezoresistive sensing elements with respect to the periphery of the well.

It is a further object of the present invention to provide a semiconductor transducer which incorporates integrated circuit electronics within the diaphragm.

It is yet another object of the present invention which concentrates stresses and strains in the diaphragm in areas in which the piezoresistors are located.

It is another object of the present invention to provide a novel method for constructing a semiconductor transducer.

According to the present invention, a semiconductor transducer includes a substrate which has a well formed in one surface thereof and a semiconductor layer bonded at its first surface to the substrate about the periphery of the well to form a diaphragm. A second surface of the semiconductor layer, which is substantially parallel to the first surface, has a pedestal projecting therefrom. The pedestal is disposed above the well. The side walls of the pedestal are substantially orthogonal to the second surface of the semiconductor layer. Means are provided for sensing the deflection of the diaphragm as a function of the force applied to the pedestal.

A further feature of the present invention includes means for limiting the deflection of the diaphragm into the well. Accordingly, structures extend from the bottom of the well to stop the deflection of diaphragm into the well.

Another feature of the present invention includes a channel in the first surface of the semiconductor layer disposed above the periphery of the well. The channel determines the clamp edge of the diaphragm. The sensing means may then be accurately positioned with respect to the channel and relatively independent of the periphery of the well. Furthermore, the periphery of the well may include notches with the diaphragm extending over the notches. The sensing means may be located within the extended portions of the diaphragm wherein stresses and strains are concentrated.

In another aspect of the present invention, the diaphragm is micromachined by selectively sawing the semiconductor layer to a selected depth to form the second surface. The part of the semiconductor layer not sawed becomes the pedestal.

These and other objects, advantages and features of the present invention will become more apparent from the following description and appended claims when read in conjunction with and with reference to the drawings.

DETAILED DESCRIPTION OF THE PREFERRED EMBODIMENTS

Figure 1:
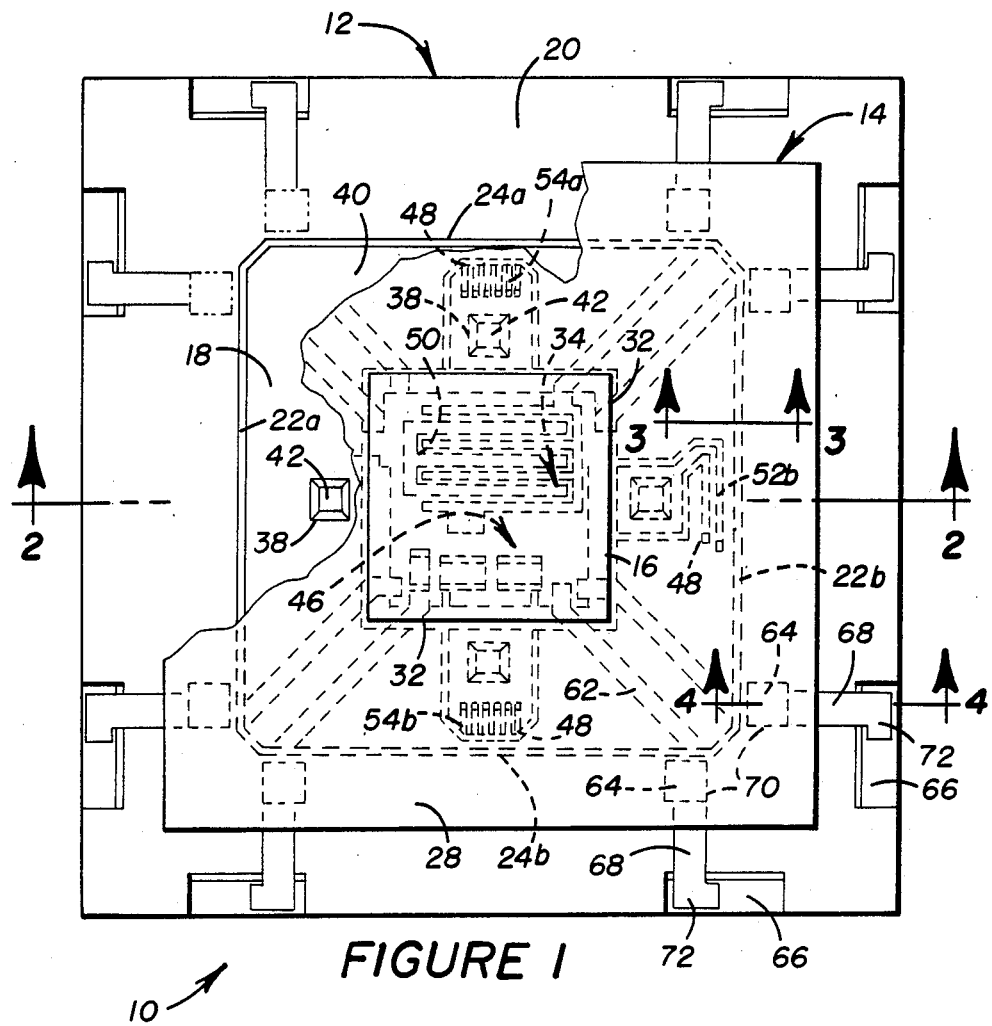
FIG. 1 is a plan view, partially broken away, of one embodiment of a semiconductor transducer constructed according to the principles of the present invention.

Referring to FIGS. 1-4, there is shown a semiconductor transducer 10 having a substrate 12, a semiconductor layer 14 and a pedestal 16.

Substrate 12 has a well 18 formed in a surface 20 thereof. In one embodiment of the present invention, substrate 12 is glass and well 18 is formed by selectively etching surface 20. Well 18 has first opposite peripheral edges 22a and 22b and second opposite peripheral edges 24a and 24b. Substrate 12 does not need to be glass or any dielectric material to practice the present invention. It is within the scope of the present invention to provide semiconductor or metallic materials for substrate 12.

Figure 2:
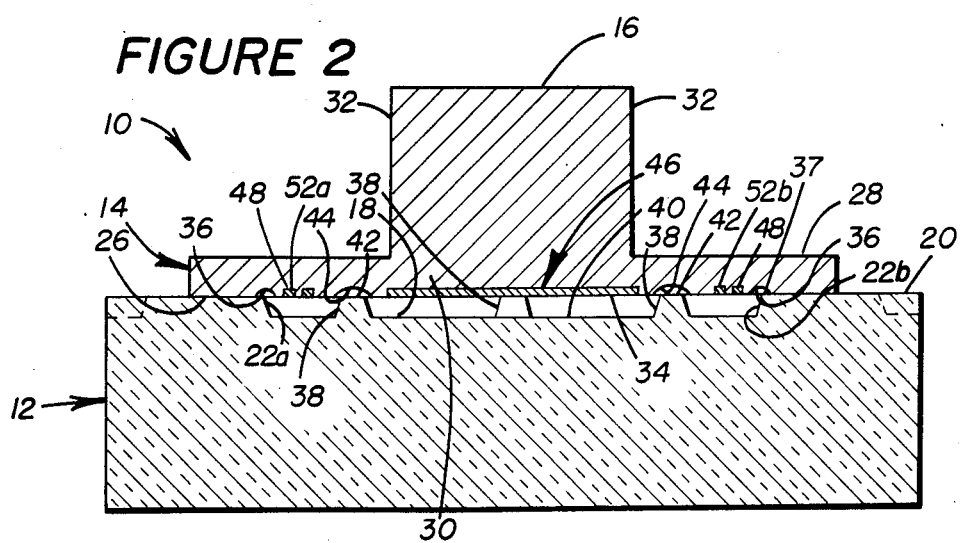
FIG. 2 is a cross section of the semiconductor transducer taken along line 2—2 in FIG. 1.

As best seen in FIG. 2, semiconductor layer 14 has a first surface 26 and a second surface 28 substantially parallel with first surface 26. First surface 26 is bonded at its edge portions to surface 20 of substrate 12 proximate to peripheral edges 22a-b and 24a-b of well 18. Semiconductor layer 14 forms a diaphragm 30 over well 18. In one embodiment of the present invention, diaphragm 30 has a thickness on the order of 100 microns.

Pedestal 16 projects outwardly from second surface 28 and has sidewalls 32 substantially orthogonal to second surface 28. Pedestal 16 deflects diaphragm 30 in response to forces applied to pedestal 16.

As hereinbelow described in greater detail, semiconductor transducer 10 further includes means 34 for sensing the deflections of diaphragm 30 in response to forces applied to pedestal 16.

According to the method of the present invention, pedestal 16 and diaphragm 30 are formed by micromachining semiconductor layer 14. A diamond saw, of the type used to separate integrated circuit chips within a silicon wafer, selectively cuts away semiconductor layer 14 to a selected depth to form second surface 28 and to leave pedestal 16. The sawing enables substantially orthogonal sidewalls 32 to be precisely machined. The importance of orthogonal sidewalls 32 in practicing the present invention is that such sidewalls 32 enhance the predictability of the regions of maximum stress and strain in diaphragm 30 for determining the most effective position of sensing means 34.

Figure 3:
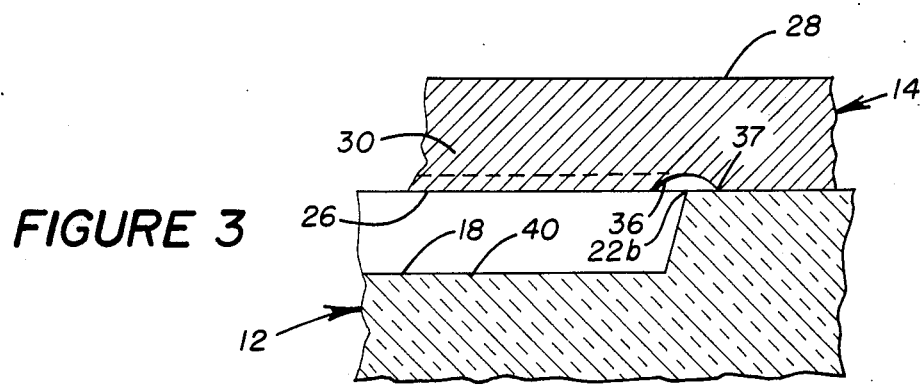
FIG. 3 is a cross section of a detail of the semiconductor transducer taken along line 3—3 in FIG. 1.

Semiconductor layer 14 further includes a channel 36 in first surface 26. Channel 36 is disposed over peripheral edges 22a-b and 24a-b of well 18. Channel 36 determines the location of a clamp edge of diaphragm 30 wherein maximum stress and strain occur in response to a force applied to pedestal 16. That is, as best seen in FIG. 3, the edge of channel 36 shown at 37 defines the clamp edge of diaphragm 30. This edge is independent of the position of the edges 22a-b and 24a-b of substrate 12. Without channel 36, the clamp edge of diaphragm 30 would occur where first surface 26 contacts peripheral edges 22a-b and 24a-b. In this latter case, should pedestal 16 not be accurately centered between peripheral edges 22a-b and 24a-b, an imbalance in sensing the stress and strain of diaphragm 30 at the clamp edge would occur. By fixing the clamp edge at the edge 37 of channel 36, a greater degree of tolerance is possible when positioning semiconductor layer 14 onto substrate 12 for bonding thereto.

Substrate 12 further includes a plurality of structures 38 extending from a bottom surface 40 of well 18. Structures 38 are formed in substrate 12 when surface 20 is selectively etched to form well 18. Structures 38 therefore have an upper surface 42 elevationally commensurate with surface 20. Semiconductor layer 14 further includes a plurality of recesses 44 disposed in first surface 26. Each recess 44 is associated with one structure 38. Recesses 44 may be formed by selectively etching first surface 26 to a selected depth. Recesses 44 are dimensioned to receive a portion of the associated one of structures 38. The depth of recesses 44 is selected to be commensurate with the maximum deflection of diaphragm 30 into well 18. Structures 38 and recesses 44 comprise means for limiting the deflection of diaphragm 30 into well 18. In one embodiment of the present invention, recesses 44 have a depth in the range of 0.5-2.0 microns.

Semiconductor transducer 10 further includes integrated circuit means 46 for transducing deflections of diaphragm 30 into an electrical signal as one particular embodiment of sensing mean 34. Integrated circuit means 46 is formed in first surface 26 within diaphragm 30. Integrated circuit means 46 includes means 48 for sensing deflections of diaphragm 30, and means 50 responsive to sensing means 48 for developing the electrical signal.

Sensing means 48 includes diffused piezoresistors 52a and 52b, associated with peripheral edges 22a and 22b, and diffused piezoresistors 54a and 54b associated with peripheral edges 24a and 24b, respectively. Piezoresistors 52a and 52b are diffused to be parallel to the respective one of peripheral edges 22a and 22b to sense longitudinal stress and strain within diaphragm 30. Similarly, piezoresistors 54a and 54b are diffused orthogonally to the respective one of peripheral edges 24a and 24b to sense latitudinal stress and strain within diaphragm 30. Piezoresistors 52a-b and 54a-b are disposed substantially at the midpoint of the respective one of peripheral edges 22a-b and 24a-b and further disposed to be proximate to the clamp edge of diaphragm 30 to sense substantially the maximum stress and strain therein. The further description of the arrangement of piezoresistors 52a-b and 54a-b will become more apparent from the description hereinbelow in reference to FIG. 6.

Electrical signal developing means 50 is disposed in first surface 26 underneath pedestal 16. This region of diaphragm 30 is a region of minimum deflection due to the thickness of pedestal 18. Thus, the electrical signal developed by developing means 50 is substantially insensitive to the effects of such stress and strain occurring in diaphragm 30 underneath pedestal 16 and therefore accurately reflects just the stress and strain measured by piezoresistors 52a-b and 54a-b. Developing means 50 is described in greater detail hereinbelow with reference to FIG. 6.

Figure 5:
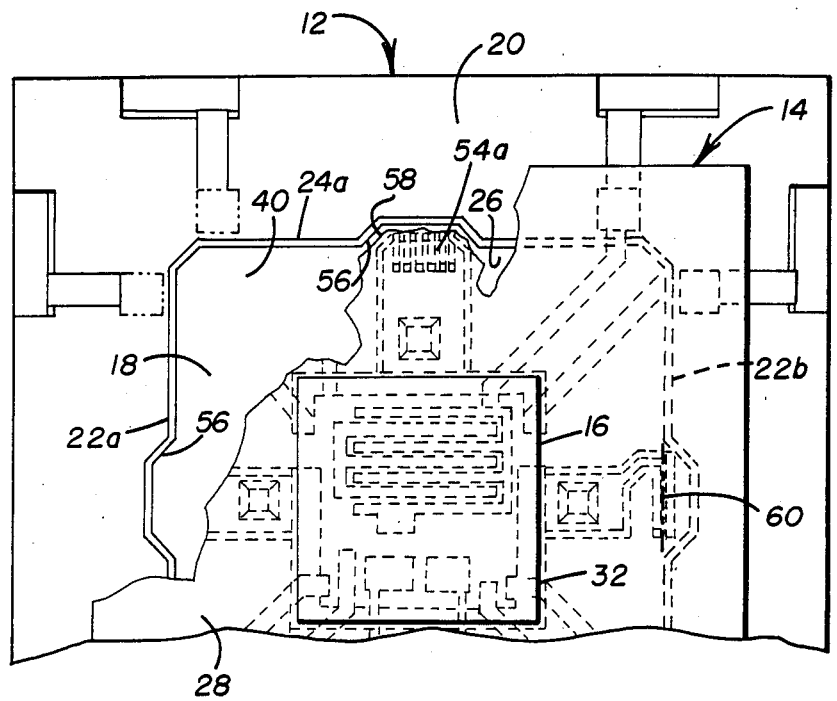
FIG. 5 is a plan view, partially broken away, of another embodiment of a semiconductor transducer constructed according to the principles of the present invention.

Referring further to FIG. 5, a modified semiconductor transducer 10' is shown. To obtain maximum sensitivity, piezoresistors 52a-b and 54a-b are ideally disposed to intersect the clamp edge of diaphragm 30. Accordingly, peripheral edges 22a-b and 24a-b each include a notch 56. Channel 36 is etched to substantially conform to the contours of notches 56. Diaphragm 30 has extended portions 58 which extend over the portion of well 18 within notches 56. Piezoresistors 52a-b and 54a-b are disposed within associated ones of extended portions 58.

The "true" clamp edge of diaphragm 30 generally follows channel 36. However, in the region of notches 56, an effective clamp edge deviates from the path of channel 36 and the true clamp edge because the extended portions 58 are relatively rigid with respect to the main body of diaphragm 30. Therefore, the effective clamp edge tends to cut across extended portions 58 as illustrated diagrammatically at 60. Notches 56 and extended portion 58 thus provide means for disposing piezoresistors 52a-b and 54a-b to intersect the effective clamp edge to sense maximum stress and strain in diaphragm 30 to optimize sensitivity.

Electrical connections to integrated circuit means 46 are made through a deposited metallization layer on first surface 26 which is selectively etched to form interconnections and bonding pads. One such interconnection is exemplarily shown in FIG. 1 at 62 and one such bonding pad is exemplarily shown at 64. Surface 20 of substrate 12 also has a deposited metallization layer to form interconnections to provide electrical conduction between a bonding pad proximate to the periphery of well 18 and a further bonding pad disposed in a recess 66 positioned exteriorly of semiconductor layer 14 at the edge portions of surface 20. An exemplarily interconnection on surface 20 in recess 66 is shown in FIG. 1 at 68 interconnecting interior bonding pad 70 and exterior bonding pad 72.

Figure 4:
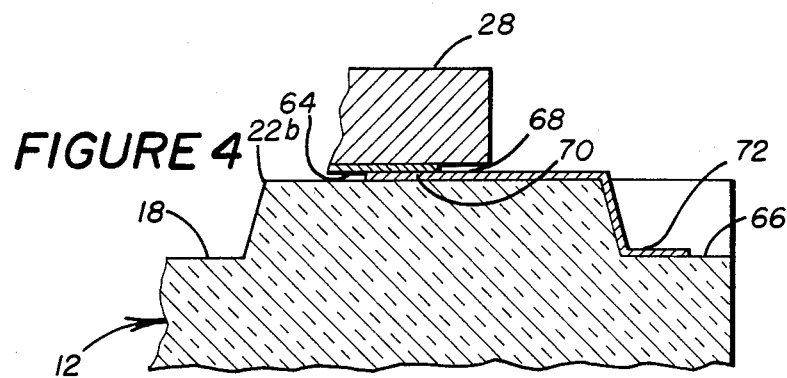
FIG. 4 is cross section of another detail of the semiconductor transducer taken along line 4—4 of FIG. 1.

As best seen in FIG. 4, when semiconductor layer 14 is bonded to substrate 12, bonding pad 64 makes an ohmic contact with interior bonding pad 70. Interconnection 68 traverses through the bond between semiconductor layer 14 and substrate 12 providing means for electrically conducting the electrical signals, such as the above described electrical signal developed by developing means 50 and further electrical signals described herinbelow, to a point 72 exterior to semiconductor layer 14. The bond between substrate 12 and semiconductor layer 14 may be a hermetic seal. The means for forming such hermetic seals with electrical interconnection, such as interconnection 66, passing therethrough, is substantially described in commonly owned U.S. Pat. No. 4,525,766, which is incorporated herein by reference. However, it is within the scope of the present invention to provide a bond between substrate 12 and semiconductor layer 14 which is not a hermetic seal, i.e., a compression bond. The seal described in the referenced application is incorporated herein to described one exemplarily means for obtaining a bond between substrate 12 and semiconductor layer 14.

Figure 6:
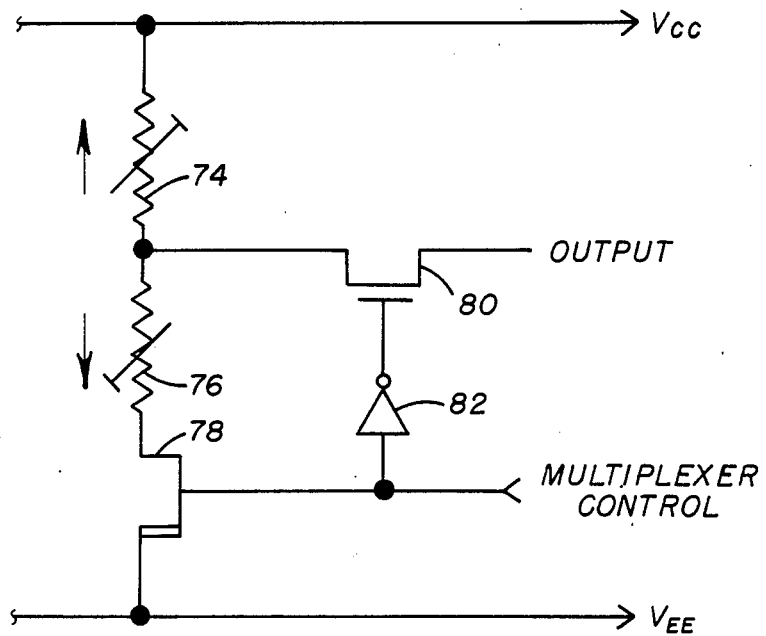
FIG. 6 is a schematic circuit diagram of an integrated circuit integrated within the semiconductor transducer of FIG. 1 or FIG. 5.

Referring now to FIG. 6, there is shown one embodiment of integrated circuit means 46. Integrated circuit means 46 includes a first piezoresistor 74 and a second piezoresistor 76 connected in series as a half bridge, and a first transistor switch 78 for selectively coupling a current through the half bridge. Integrated circuit means 46 further includes a second transistor switch 80 for coupling the node voltage between piezoresistor 74 and piezoresistor 76 to one of the bonding pads 64 on first surface 26 of semiconductor layer 14.

To turn on transistor switch 78, a multiplexer control signal is applied to its gate. The control signal is inverted by an inverter 82 and is applied to the gate of transistor switch 80 to also turn on this transistor. Therefore, when transducer 10 is addressed by a multiplexer control signal, the node voltage to the half bridge between piezoresistor 74 and piezoresistor 76 is coupled to an output. A node voltage is a function of the force applied to pedestal 16.

Piezoresistor 74 is the circuit equivalent of a series connection between diffused resistors 52a and 52b. Similarly, piezoresistor 76 is a circuit equivalent of a series connection between diffused resistors 54a and 54b. As hereinabove described, diffused resistors 52a and 52b transduce stress and strain within diaphragm 30 which is longitudinal to the clamp ledge. Conversely, diffused resistors 54a and 54b transduce stress and strain latitudinally to the clamp edge. Therefore, in response to a force applied to pedestal 18, the change of resistive value of piezoresistors 74 and 76 are of opposite polarity. In other words, as the resistance of piezoresistor 74 increases, the resistance of piezoresistor 76 decreases. Transistor switch 78 selectively couples this half bridge between a first potential $V_{cc}$ and a second potential $V_{ee}$. Piezoresistor 74 and piezoresistor 76 comprise sensing means 48 of integrated circuit means 46. Transistor switch 78, transistor switch 80 and inverter 82 comprise electrical signal developing means 50 of integrated circuit means 46.

Transistor switch 78 and transistor 80 are preferably n-channel and p-channel devices, respectively. However, this need not be the case. For example, transistor switch 80 may also be a n-channel device, which eliminates the need for inverter 82. In the preferred embodiment of the present invention, a p-channel MOSFET transistor switch 80 is preferred because it does not require an additional diffusion step when fabricating integrated circuit means 46.

The arrangement of piezoresistors 74 and 76 has been selected so that only forces applied normal to the top surface of pedestal 16 are transduced. Furthermore, by defining piezoresistor 74 to be the series equivalent of diffused resistors 52a and 52b and piezoresistor 76 to be the series equivalent of diffused resistors 54a and 54b, any alignment offset of pedestal 16 with respect to the diffused resistors is compensated for. For example, the resistance error in diffused resistor 52a due to alignment offset will be equal in magnitude but of opposite polarity to the resistance error in diffused resistor 52b. Such alignment offset of pedestal 16 could result from the effect of a slip force or a rotational force thereon.

Figure 7:
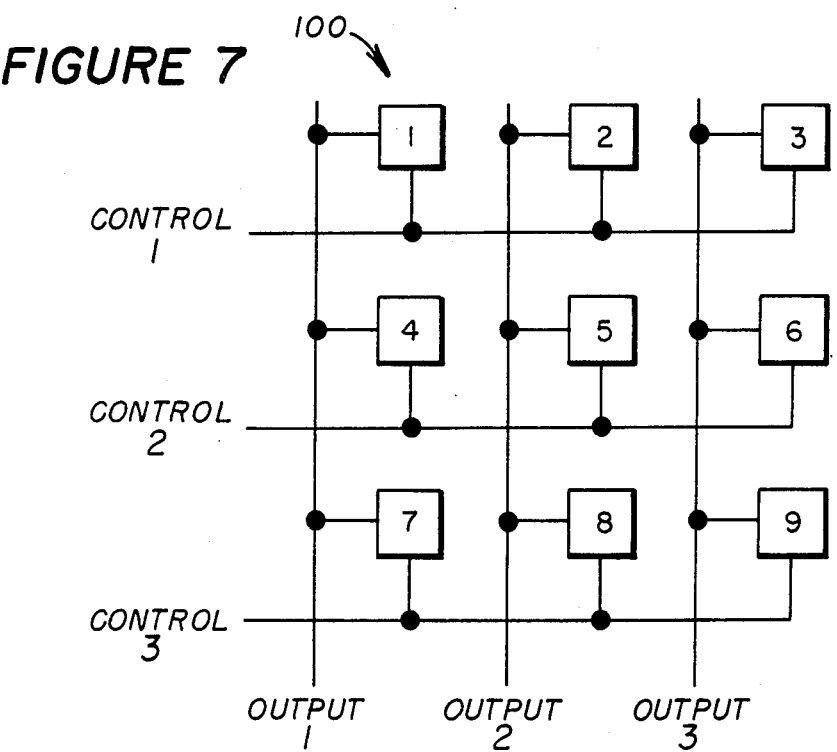
FIG. 7 is a schematic block diagram of an exemplary array of multiplexed semiconductor transducers.

Referring now to FIG. 7, there is shown an array 100 incorporating a plurality of semiconductor transducers, similar to transducer 10 or 10'. In the array 100, the transducers in a given row are simultaneously addressed by applying a multiplexer control signal to a selected one of the row control lines illustrated as control 1, control 2 and control 3. The output of the addressed transducers are coupled to an associated column output line, shown as output 1, output 2 and output 3. The output lines may be coupled to a data bus, and the output voltages digitized and processed by a conventional external processing means (not shown). Thus, by incorporating integrated circuit means 46 within the transducer, simplified multiplexing of an array 100 of transducers is possible for tactile or force sensing.

There has been disclosed novel apparatus and techniques for sensing of forces by integrated circuit transducers. It should be obvious to those skilled in the art that numerous uses of and modifications to the present invention may be made without departing from the inventive concepts disclosed herein. Accordingly, the present invention is to be limited solely by the scope of the following claims.

What is claimed is:

1. A semiconductor transducer comprising:
   a substrate having a well formed in one surface thereof;
   a semiconductor layer having first and second substantially parallel surfaces, the edge portions of said first surface being bonded to said substrate about the periphery of said well, said layer forming a diaphragm over said well;
   a pedestal projecting outwardly from said second surface and being disposed above said well for deflecting said diaphragm in response to a force applied to said pedestal, said pedestal having one or more side walls being substantially orthogonal to said second surface;
   integrated circuit means for transducing deflections of said diaphragm into an electrical signal and being formed at said first surface within said diaphragm, said integrated circuit means having means for sensing deflections of said diaphragm and means responsive to said sensing means for developing said electrical signal as a function of the deflection of said diaphragm; and
   means for electrically conducting said signal to a point on said substrate exteriorly of said semiconductor layer.

2. A transducer as set forth in claim 1 wherein said sensing means is selectively disposed in regions of maximum stress and strain caused by deflections of said diaphragm and said developing means is selectively disposed in regions of minimum stress and strain caused by deflections of said diaphragm.

3. A transducer as set forth in claim 1 wherein said sensing means includes a plurality of resistors diffused in said diaphragm proximate to the periphery of said well.

4. A transducer as set forth in claim 3 wherein said well is substantially rectangular, each one of said resistors being associated with one peripheral edge of said well and being disposed substantially at a midpoint of the associated peripheral edge.

5. A semiconductor transducer as set forth in claim 4 wherein said resistors are interconnected in the half bridge network, said resistors disposed at first opposite peripheral edges of said well being connected in series to form a first resistor of said half bridge, said resistors disposed at second opposite peripheral edges of said well being connected to form a second resistor of said half bridge.

6. A semiconductor transducer as set forth in claim 5 wherein said first resistor senses longitudinal stresses and strains of said diaphragm and said second resistor senses latitudinal stresses and strains of said diaphragm.

7. A semiconductor transducer as set forth claim 5 wherein said developing means includes:
   means for selectively developing a current through a series connection of said first resistor and said second resistor; and
   means for developing said electrical signal as a function of the node voltage between said first resistor said said second resistor.

8. A semiconductor transducer as set forth in claim 7 wherein said current developing means includes:
   a transistor switch coupled in series with said half bridge for selectively coupling said half bridge between a source of a first potential and source of second potential; and
   means for selectively turning on said switch to couple a current through said half bridge.

9. A semiconductor transducer as set forth in claim 7 wherein said means for developing said electrical signal as a function of the node voltage includes a transistor switch coupled to said node; and
   means for selectively turning on said transistor switch.

10. A semiconductor transducer comprising:
    a substrate having a well formed in one surface thereof;
    a semiconductor layer having first and second substantially parallel surfaces, the edge portions of said first surface being bonded to said substrate about the periphery of said well, said layer forming a diaphragm over said well;
    a pedestal projecting outwardly from said second surface and being disposed above said well for deflecting said diaphragm in response to a force applied to said pedestal;
    integrated circuit means for transducing deflections of said diaphragm into an electrical signal, said integrated circuit means including means for developing said electrical signal, said developing means being disposed at said first surface substantially underneath said pedestal; and
    means for electrically conducting said signal to a point on said substrate exteriorly of said semiconductor layer.

11. A transducer as set forth in claim 10 wherein said integrated circuit means includes means for sensing deflections of said diaphragm, said sensing means being selectively disposed in regions of maximum stress and strain caused by deflections of said diaphragm.

12. A semiconductor transducer as set forth in claim 11 wherein said sensing means includes a first resistor and a second resistor, the resistance of each of said first resistor and said second resistor being a function of deflections of said diaphragm.

13. A semiconductor transducer as set forth in claim 12 wherein said well is substantially rectangular, said first resistor being a series connection of two diffused resistors disposed proximate to first opposite peripheral edges of said well, a second resistor being a series connection of diffused resistors disposed proximate to second opposite edges of said well.

14. A semiconductor transducer as set forth in claim 13 wherein said diffused resistors are disposed substantially at a midpoint of each peripheral edge.

15. A semiconductor transducer comprising:
    a substrate having a substantially rectangular well formed in one surface thereof;
    a semiconductor layer having first and second substantially parallel surfaces, the edge portions of said first surface being bonded to said substrate about the periphery of said well, said layer forming a diaphragm over said well;
    a pedestal projecting outwardly from said second surface and being disposed above said well for deflecting said diaphragm in response to a force applied to said pedestal;

integrated circuit means for transducing deflection of said diaphragm into an electrical signal, said integrated circuit means including means for developing said electrical signal, said developing means being disposed at said first surface substantially underneath said pedestal, and said integrated circuit means also including means for sensing deflections of said disphragm, said sensing means being selectively disposed in regions of maximum stress and strain caused by deflection of said diaphragm and including first and second resistors each having a resistance which is a function of delections of said diaphragm, said first resistor being a series connection of two diffused resistors disposed proximate to first opposite peripheral edges of said well at substantially the midpoint of each said peripheral edge, and said second resistor being a series connection of diffused resistors disposed proximate to second opposite edges of said well at substantially the midpoint of each said peripheral edge; and means for electrically conducting said signal to a point on said substrate exteriorly of said semiconductor layer, wherein said peripheral edges of said well include notches extending outwardly from said well disposed substantially at the midpoint of said peripheral edges, said diffused resistors being disposed in said diaphragm within said notches.

16. A semiconductor transducer as set forth in claim 12 wherein said first resistor senses longitudinal deflections of said diaphragm and said second resistor senses latitudinal deflections of said diaphragm.

17. A semiconductor transducer as set forth in claim 16 wherein said integrated circuit means further includes:
   means for selectively developing a current through a series connection of said first resistor and said second resistor; and
   means for developing said electrical signal as a function of the node voltage between said first resistor and said second resistor.

18. A semiconductor transducer as set forth in claim 17 wherein said current developing means includes:
   a transistor switch coupled in series with said half bridge for selectively coupling said half bridge between a source of a first potential and source of second potential; and
   means for selectively turning on said switch to couple a current through said half bridge.

19. A semiconductor transducer as set forth in claim 18 wherein said means for developing said electrical signal as a function of the node voltage includes a transistor switch coupled to said node; and
   means for selectively turning on said transistor switch.

20. A semiconductor transducer comprising:
   a substrate having well formed in one surface thereof;
   a semiconductor layer having first and second substantially parallel surfaces, the edge portions of said first surface being bonded proximate to the periphery of said well, said layer forming a diaphragm over said well, said first surface having a channel therein disposed over the periphery of said well and substantially conforming to the shape of the periphery of said well;
   a pedestal projecting outwardly from said second surface and being disposed above said well for deflecting said diaphragm in response to a force applied to said pedestal; and means for sensing the deflection of said diaphragm.

21. A semiconductor transducer comprising:
   a substrate having a well formed in one surface thereof; a semiconductor layer having first and second substantially parallel surfaces, the edge portions of said first surface being bonded proximate to the periphery of said well, said layer forming a diaphragm over said well;
   a pedestal projecting outwardly from said second surface and being disposed above said well for deflecting said diaphragm in response to a force applied to said pedestal;
   means for limiting the maximum deflection of said diaphragm into said well; and
   means for sensing the deflection of said diaphragm, wherein said limiting means includes:
   a plurality of structures extending from the bottom surface of said well and having an upper surface elevationally commensurate with the surface of said substrate;
   a plurality of recesses formed in said first surface of said semiconductor layer, each of said recesses being associated with one of said structures and being dimensioned for receiving a portion of said structures, the depth of said recesses determining the maximum deflection of said diaphgram into said well.

22. A semiconductor transducer comprising:
   a substrate having a well formed in one surface thereof and at least one notch disposed about the periphery of said well;
   a semiconductor layer having first and second substantially parallel surfaces, the edge portions of said first surface being bonded proximate to the periphery of said well to define a clamp edge, said layer forming a diaphragm each over said well, said diaphragm having an extended portion over each said notch in which stress and strains caused by deflections of said diaphragm are concentrated;
   a pedestal projecting outwardly from said second surface and being disposed above said well for deflecting said diaphragm in response to a force applied to said pedestal; and
   means for sensing the deflection of said diaphragm including a piezoresistive sensing element disposed in each said extended portion and means for developing an electrical signal in response to changes of said piezoresistive elements.

23. A transducer as set forth in claim 22 wherein said semiconductor layer further includes a channel in said first surface being disposed over the periphery of said well, an effective clamp edge of said diaphragm transversing each said extended portion.

24. A semiconductor transducer comprising:
   a substrate having a well formed in one surface thereof:
   a semiconductor layer having first and second substantially parallel surfaces, the edge portions of said first surface being bonded proximate to the periphery of said well, said semiconductor layer forming a diaphragm over said well, said semiconductor layer further including a channel in said first surface being disposed over the periphery of said well;
   a pedestal projecting outwardly from said second surface and being disposed above said well for deflecting said diaphram in response to a force applied to said pedestal, said pedestal having one or more side walls substantially orthogonal to said second surface; and means for sensing the deflection of said diaphragm.

25. A transducer as set forthe in claim 24 wherein said substrate further includes a plurality of structures extending from the bottom surface of said well and being dimensioned for limiting the deflection of said diaphragm into said well.

26. A transducer as set forth in claim 25 wherein said semiconductor layer further includes a plurality of recesses, each of said recesses being associated with one of said structures and being dimensioned for receiving a portion of the associated one of said structures.

27. A semiconductor transducer comprising:
a substrate having a well formed in one surface thereof:
a semiconductor layer having first and second substantially parallel surfaces, the edge portions of said first surfaces being bonded proximate to the periphery of said well, said layer forming a diaphragm over said well;
a pedestal projecting outwardly form said second surface and being disposed above said well for deflecting said diaphragm in response to a force applied to said pedestal, said pedestal having one or more sidewalls substantially orthogonal to said second surface;
means for sensing the deflections of said diaphragm; and
means for limiting the maximum deflection of said diaphragm into said well, including a plurality of structures extending from the bottom surface of said well and having an upper surface elevationally commensurate with the surface of said substrate, and a plurality of recesses formed in said first surface of said semiconductor layer, each of said recesses being associated with one of said structures and being dimensioned for receiving a portion of said structures, the depth of said recesses determining the maximum deflection limit of said diaphragm ino said well.

* * * * *